United States Patent [19]

Eastman

[11] Patent Number: 4,837,314
[45] Date of Patent: Jun. 6, 1989

[54] ETHERIFIED AND ESTERIFIED STARCH DERIVATIVES AND PROCESSES FOR PREPARING SAME

[75] Inventor: James E. Eastman, Decatur, Ill.

[73] Assignee: A. E. Staley Manufacturing Company, Decatur, Ill.

[21] Appl. No.: 65,036

[22] Filed: Jun. 19, 1987

[51] Int. Cl.$^4$ .................... C08B 31/08; C08B 31/02
[52] U.S. Cl. ................................. 536/111; 536/107
[58] Field of Search ............................ 536/107, 111

[56] References Cited

U.S. PATENT DOCUMENTS

| | | | |
|---|---|---|---|
| 3,632,803 | 1/1972 | Hjermstad et al. | 260/233.3 |
| 4,452,978 | 6/1984 | Eastman | 536/111 |
| 4,465,702 | 8/1984 | Eastman et al. | 426/578 |
| 4,716,186 | 12/1987 | Portnoy et al. | 536/111 |

FOREIGN PATENT DOCUMENTS 781209  8/1954  United Kingdom ................ 536/111

OTHER PUBLICATIONS

Chapter XIII on "Starch Derivatives" from a book entitled Starch: Chemistry and Technology, vol. II, Industrial Aspects by Roy L. Whistler and Eugene F. Paschall (1967).

*Primary Examiner*—Joseph L. Schofer
*Assistant Examiner*—Alex H. Walker
*Attorney, Agent, or Firm*—Michael F. Campbell; J. Daniel Wood

[57] ABSTRACT

Cold water soluble etherified or esterified starch derivatives having a 20 rpm Brookfield viscosity of less than 15,000 cps when tested in the form of a 10 weight percent starch solids aqueous solution at 25° C. and which forms a transparent film when dried from aqueous solution can be prepared by first preparing a non-cross-linked granular etherified or esterified starch derivative, washing said starch derivative to remove salt by-products therefrom and thereafter solubilizing said starch derivative and thinning same to the desired viscosity level. The resulting starch derivative products are particularly suitable for use in wall covering adhesive formulations and as protective colloids in emulsion polymerization processes.

20 Claims, No Drawings

4,837,314

ETHERIFIED AND ESTERIFIED STARCH DERIVATIVES AND PROCESSES FOR PREPARING SAME

BACKGROUND OF THE INVENTION

The present invention relates to certain etherified or esterified starch derivatives which form relatively low to moderate viscosity solutions when dissolved in water at a starch solids level of about 10 weight percent on a total solution weight basis and which form clear, transparent films upon drying from an aqueous solution thereof and to processes for the preparation of such starch derivatives.

As a general proposition, etherified and esterified starch derivatives such as, for example, methylated starch, ethylated starch, hydroxyethyl starch, hydroxypropyl starch, carboxymethyl starch, starch formate, starch acetate, starch propionate, starch butyrate, etc. are known materials. However, such materials as heretofore prepared have been of a type which exhibited relatively high viscosity in the form of aqueous solutions containing 10 weight percent of said starch derivative on a total solution weight basis and/or which did not form clear transparent films when dried from an aqueous solution thereof. As a result, these previous etherified or esterified starch derivatives have not been suitable for use as a replacement for low-to-medium viscosity natural gums (e.g., gum arabic, etc.) in various end-uses requiring a combination of cold water solubility, relatively low, stable viscosities in relatively high solids aqueous solutions and the ability to form clear, transparent films when dried from aqueous solution.

Also known in the prior art is the concept of depolymerizing or "thinning" starch or the various starch derivatives via the treatment thereof with enzymes such as amylases or with various acidic materials and the fact such treatment generally has the effect, depending upon the extent or severity of such treatment, of reducing the viscosity exhibited by aqueous solutions of the so-treated starch product. As heretofore prepared, however, acid or enzyme thinned starch products have been of a type which tended to retrograde upon standing in aqueous solution and/or which did not form non-hazy, transparent films when dried from an aqueous solution thereof. As a result, the previously available acid or enzyme thinned starch products have also not been suitable for use as a replacement for low-to-medium viscosity natural gums in the aforementioned end-use applications.

In view of the foregoing, it would be highly desirable to provide a means of obtaining a cold water soluble starch-based product having a combination of relative low to moderate, stable viscosity characteristics in relatively high solids (e.g., 10%, 25%, 40%, etc.) aqueous solutions thereof and the ability to form clear, transparent films upon drying from aqueous solution.

SUMMARY OF THE INVENTION

It has now been discovered that certain novel cold water soluble etherified or esterified starch derivatives having the above-described combination of viscosity and film clarity characteristics can be suitably obtained when the processing steps, features and parameters which are hereinafter set forth are satisfied and/or followed. Accordingly, the present invention, in one of its aspects, is a cold water soluble etherified or esterified starch derivative having an average degree of ether or ester substitution of from about 0.05 to about 1 per anhydroglucose unit and which has a Brookfield Model RVF viscosity at 20 rpm of less than 15,000 centipoise (cps) when tested in the form of a 10 weight percent starch derivative solids aqueous solution at 25° C. and which forms a transparent film when dried from an aqueous solution thereof.

In another of its aspects, the present invention is a process for preparing a cold water soluble etherified or esterified starch derivative which has a Brookfield Model RVF viscosity at 20 rpm of less than 15,000 cps when tested in the form of a 10 weight percent starch derivative solids aqueous solution at 25° C. and which forms a transparent film when dried from an aqueous solution thereof, said process comprising the steps of:

a. etherifying or esterifying a non-derivatized, non-crosslinked granular starch starting material with a monofunctional etherifying or esterifying agent to an average ether or ester degree of substitution in the range of from about 0.05 to about 1 of ether or ester substituents per anhydroglucose unit in said starch material under conditions which result in the etherified or esterified starch derivative remaining in non-crosslinked, non-gelatinized, granular form following the etherification or esterification process;

b. separating the etherified or esterified granular starch derivative prepared in step (a) from at least a substantial proportion of any salt by-products formed during the etherification or esterification reaction;

c. treating the etherified or esterified starch derivative to render it cold water soluble; and d. depolymerizing the etherified or esterified starch derivative in a liquid reaction medium to a degree which results in said derivative having a Brookfield Model RVF viscosity at 20 rpm of less than 15,000 cps when tested in the form of a 10 weight percent starch derivative aqueous solution at 25° C.

Naturally, the process for preparing the indicated starch derivatives need not necessarily be a fully integrated process including the etherification or esterification reaction step itself and can instead use as the starting material therefor a previously and separately prepared non-crosslinked, granular etherified or esterified starch material. In addition, it is also to be noted that in certain instances an individual, separately stated functional step or feature recited above may inherently and/or simultaneously be accomplished during or in conjunction with or as a result of a different, separately recited treatment step or operation. For example, in many cases derivatization (i.e., etherification or esterification) to an average degree of ether or ester substitution in excess of about 0.15 of such substituents per anhydroglucose unit will cause the resulting starch derivative to become cold water soluble without any further treatment being required to accomplish that result. On the other hand, conducting one or more of the other specifically recited treatment steps (e.g., the derivatization reaction itself and/or the depolymerization step, etc.) under conditions wherein the starch material of interest is slurried or dissolved in an aqueous lower alkanol solution may (depending upon conditions such as the temperature used, the water content of the lower alkanol solution employed, etc.) serve to also inherently remove salt by-products generated during the derivatization reaction and/or to render an otherwise cold water insoluble starch derivative cold water soluble.

In light of the foregoing and in accordance with observations made in connection with the present invention, said invention in another of its aspects is a process for preparing a cold water soluble etherified or esterified starch derivative which has a Brookfield Model RVF viscosity at 20 rpm of less than 15,000 cps when tested in the form of a 10 weight percent starch derivative solids aqueous solution at 25° C. and which forms a transparent film when dried from an aqueous solution thereof, said process comprising the steps of:

a. obtaining or preparing a non-crosslinked granular etherified or esterified starch derivative having an average ether or ester degree of substitution ranging from about 0.15 to about 1 ether or ester substituents per anhydroglucose unit in said starch derivative; and b. contacting said starch derivative with an aqueous lower alkanol solution containing, on a total solution weight basis, from about 5 to about 30 weight percent water and from about 0.1 to about 5 weight percent of an organic or inorganic acid at a temperature of from about 20 to about 180° C. for a time period of from about 1 minute to about 8 hours.

The cold water soluble starch derivatives prepared in accordance the present invention can be advantageously used in a wide variety of end-use applications such as, for example, as wallcovering adhesives and in other remoistenable adhesives applications, as encapsulating agents in various food and/or industrial applications, as protective colloids in emulsion polymerization processes and the like.

As used herein, the term "non-gelatinized" connotes starch material which has not been subjected to granule fragmenting process conditions and which therefore consists essentially of whole unfragmented granules.

The term "cold water soluble" as used herein connotes starch materials which are at least about 90% (preferably at least about 95% and most preferably at least about 99%) soluble in 25° C. water.

DETAILED DESCRIPTION OF THE INVENTION

Non-derivatized, non-crosslinked granular starch starting materials suitable for use herein can be obtained from a wide variety of plant sources such as, for example, corn, potato, wheat, rice, waxy maize, tapioca, etc. In those instances wherein the starch starting material chosen for use is of a type which contains significant levels of fats, oils or other lipid materials (e.g., in the case of dent corn, waxy maize, wheat starches, etc.), it is generally preferred to ensure that at least one step in the preparation process hereof involves (e.g., either as a separate and distinct treatment step or operation or as an inherent part of one or more of the etherification or esterification reaction, salt removal, solubilization and/or depolymerization steps) contacting said starch material under elevated temperature conditions (e.g., at a temperature in the range of from about 100 to about 180° C.) with an organic solvent system (preferably an aqueous lower alkanol solution containing from about 5 to about 25 weight percent water on a total solution weight basis) in order to ensure and/or maximize the desired film clarity in the final etherified or esterified starch product. In those instances wherein a relatively fat-free starch starting material (e.g., potato starch, tapioca starch, etc.) is employed, the above-mentioned elevated temperature contact with an organic solvent system is of lesser importance as to the film clarity of the final etherified or esterified starch product. An especially preferred starch starting material for use herein is common (or "dent") corn starch.

Monofunctional etherifying agents suitable for use herein include lower (i.e., $C_1$-$C_4$) alkyl halides (e.g., methyl chloride, ethyl chloride, etc.); di (lower alkyl) sulfates (e.g., dimethyl sulfate, diethyl sulfate, etc.); lower alkylene oxides (e.g., ethylene oxide, propylene oxide, etc.); halogenated lower carboxylic acids or salts thereof (e.g., chloroacetic acid, bromoacetic acid, etc. and alkali metal salts thereof) and the like so as to provide or result in lower alkyl starch ethers, hydroxy-lower alkyl starch ethers, carboxy-lower alkyl starch ethers and the like. Preferred monofunctional etherifying agents for use herein include ethylene oxide, propylene oxide, haloacetic acid (especially chloroacetic acid) or salts thereof (especially alkali metal salts thereof) so as to produce hydroxyethylated, hydroxypropylated or carboxymethylated starch derivatives. An especially preferred monofunctional etherifying agent for use herein is propylene oxide.

Monofunctional esterifying agents suitable for use herein include anhydrides, mixed anhydrides or acyl halides of lower (i.e., $C_1$ to $C_4$) alkanoic acids such as formic acid, acetic acid, propionic acid, butyric acid, etc. so as to produce, for example starch formate, starch acetate, starch propionate, starch butyrate and the like. Starch derivatives suitable for use herein also include those containing inorganic substituents such as sulfate, sulfonate, phosphate, etc. and mixed organic/inorganic substituents such as sulfopropyl groups.

If desired, mixed esterified and etherified starch derivatives can be prepared and/or employed in accordance with the present invention. In such event, it is generally preferred to conduct the etherification reaction first and to subsequently do the esterification reaction.

As a general rule, the etherified and/or esterified starch derivatives prepared and/or employed in accordance with the present invention have a total degree of ether and/or ester substitution ranging from an average of from about 0.05 to about 1 of such substituents per anhydroglucose unit within the starch derivative molecule. Preferably, said starch derivatives have an average ether and/or ester degree of substitution (D.S.) of from about 0.1 to about 0.5 (especially from about 0.15 to about 0.4) of such substituents per anhydroglucose unit.

The indicated etherified or esterified starch derivatives can be prepared in any conventional fashion as may be desired from the non-derivatized, non-crosslinked granular starch starting material of choice so long as the resulting derivatized starch product remains in non-gelatinized, non-crosslinked granular form following the derivatization reaction, thereby permitting or facilitating the separation of said starch derivative from at least a substantial proportion (preferably most or substantially all) of any salt by products generated during the course of the derivatization reaction.

Suitable conventional etherification or esterification procedures thus generally include known "dry reaction" processes (i.e., wherein the granular starch starting material, typically having a moisture content of from about 3 to about 15 on a moist starch material total weight basis, is reacted as a mass of solid granules with a liquid or gaseous etherifying or esterifying agent.); known solvent-based reaction processes (e.g., wherein the granular starch starting material is reacted with the monofunctional etherifying or esterifying agent in the form of a slurry of said starch material in an aqueous lower, i.e., $C_1$–$C_4$, alkanol solution containing from about 5 to about 50 weight percent water on a total aqueous alkanol solution weight basis); and known water slurry reaction processes wherein a limited amount of ether or ester substituents (typically limited to an ether or ester D.S. of from about 0.05 to about 0.15 in order to avoid pasting or gelatinizing the resulting starch derivative during the reaction process) are reacted onto the starch starting material in the form of a water slurry containing from about 10 to about 70 parts by weight of granular starch starting material per 100 parts by weight of water.

As a general rule, the aforementioned etherification or esterification procedures are typically conducted under alkaline conditions (e.g., in the presence of an alkaline material such as alkali metal oxides or hydroxides, alkaline earth metal hydroxides, ammonium hydroxide, etc.).

Typically, the aforementioned "dry reaction" process is conducted at a temperature of from about 30 to about 100° C. (preferably from about 50 to about 70° C.); at a pressure of from about 30 to about 500 (preferably from about 40 to about 100) psi (gauge) and for a reaction period of from about 5 to about 24 hours.

Typically, the "solvent process" referred to above is conducted at a starch starting material content corresponding to from about 10 to about 100 parts by weight thereof per 100 parts by weight of the aqueous lower alkanol solution; at a reaction temperature of from about 100 to about 180° C. (preferably from about 130 to about 160° C.); at a pressure of from 0 to about 400 (preferably from about 100 to about 400) psig; and for a reaction period of from about 1 minute to about 4 hours. Preferred lower alkanols for use in the indicated solvent process include $C_1$ to $C_3$ alkanols with the use of ethanol and denatured ethanol being particularly preferred. It is also generally preferred that the water content of the aqueous lower alkanol solution be in the range of from about 5 to about 25) weight percent on a aqueous lower alkanol solution total weight basis.

Typically, the aforementioned water slurry reaction is conducted at a temperature in the range of from about 25 to about 45 ° C. (preferably from about 35 to about 45° C.) and can employ known gelatinization preventing salts such as sodium chloride, sodium sulfate etc. (typically in amounts ranging from about 0 to about 20 weight percent on an aqueous salt solution weight basis) in order to prevent pasting or gelatinization of the desired starch derivative during the course of the reaction process. This type of reaction process is also generally conducted at a pH of from about 10 to about 12; at a pressure of from about 0 to about 20 psig; and for a reaction period of from about 5 to about 24 hours.

In practicing the process of the present invention, it is a requirement (a) that the etherified or esterified starch derivative remain in non-gelatinized, granular form following the etherification or esterification reaction in order that salt by-products formed therein (e.g., by reaction of alkaline catalysts such as sodium hydroxide with etherifying reagents such as haloacetic acid, methyl halides, etc. and/or as a result of neutralizing residual or excess alkaline catalyst at the end of said reaction) can be removed therefrom (e.g., via washing and filtration or centrifugation operations) and (b) that such salt removal operation be accomplished prior to permitting (or causing) said starch derivative to become gelatinized as may occur, if desired, in subsequent stages of the overall preparation process.

As a general rule, it is preferred to accomplish the indicated salt removal by washing the non-gelatinized, granular etherified or esterified starch product at least once (and preferably a plurality of times) with a liquid material [e.g., a lower alkanol or an aqueous lower alkanol solution (preferably containing from about 5 to about 50 weight percent water on a total solution weight basis)] which does not cause the starch derivative to gelatinize under the washing conditions employed (preferably at a temperature of from about 20 to about 50° C.) and recovering said product from said solution following each wash via filtration or centrifugation. However, in those instances wherein the etherification or esterification reaction is itself conducted in an aqueous lower alkanol reaction medium, adequate salt removal will oftentimes by inherently achieved by simply removing the etherified or esterified granular starch product from said reaction medium without the requirement for a separate and distinct washing step or operation. Similarly, in those instances wherein a downstream step or operation (e.g., the treatment to render the granular starch derivative cold water soluble or the depolymerization operation) is to be conducted in the indicated type of aqueous alkanol solution with subsequent filtration or centrifugation prior to permitting or causing the starch derivative of interest to become gelatinized, adequate salt removal will typically be accomplished in conjunction with said downstream treatment step or operation and a separate and distinct aqueous alkanol washing step will not be required.

In those instances, wherein the etherified or esterified starch derivative of interest has a sufficiently low degree of ether or ester substitution (e.g., typically in the range of from about 0.05 to 0.15 ether or ester D.S.) so as to not inherently be cold water soluble, it is feasible (and oftentimes preferable) to accomplish the desired salt removal washing said starch derivative with plain water and filtering or centrifuging.

Regardless of the specific nature of the washing liquid employed, the indicated salt removal step is conducted under conditions (e.g., pH temperature, etc.) such that the starch derivative is not pasted, solubilized or gelatinized during the washing process and can therefore be physically separated from the washing liquid thereafter by settling and decanting, filtering, centrifuging, etc.

As has been noted above, etherified or esterified starch derivatives for use herein (e.g., carboxymethylated, acetylated, hydroxyethylated, hydroxypropylated, etc.) having an average ether or ester degree of substitution of about 0.15 or more are generally inherently cold water soluble and need no separate treatment to impart that particular property or characteristic thereto. In other cases, however, etherified or esterified starch derivatives to be employed herein which are cold water insoluble can be rendered cold water soluble by contacting same with water or an aqueous lower alkanol solution (preferably containing from about 10 to about 30 weight percent water) at a temperature of from about 100 to about 180° C. (preferably from about 120 to about 160° C.) for a time period of from about 5 seconds to about 15 minutes. Such treatment can constitute or be conducted as a separate and distinct treatment step or can be inherently or simultaneously accomplished in connection with a different functional treatment in the overall process of interest (e.g., in connection with an elevated temperature aqueous lower alkanol salt removal step, derivatization at elevated temperature in an aqueous lower alkanol reaction medium and/or depolymerization at elevated temperature in an aqueous lower alkanol liquid treatment medium). In any event, it is generally preferred that the etherified or esterified starch derivatives hereof (whether or not they are otherwise inherently cold water soluble) be exposed to (i.e., contacted with) a relatively hot (e.g., about 100° to about 180° C.) aqueous lower alkanol solution (preferably for a time period of from about 1 minute to about 4 hours) at some stage in the overall treatment process of interest since such a treatment can also serve to remove various organic constituents (e.g., fats, oils, other lipid material, protein, organic derivatization process by-products, residual etherification or esterification agents, etc.) therefrom and to thereby improve the film clarity of the ultimate etherified or esterified starch product of interest. It is generally preferred in this regard that the starch derivatives hereof have a fat content of less than 0.25 (more preferably less than 0.15) weight percent in their final or finished form.

Depolymerization of the etherified or esterified starch derivatives hereof is conducted in a liquid medium (preferably water or an aqueous lower alkanol solution of the type discussed above) to reduce the viscosity which said derivatives exhibit when dissolved in water. As a general rule, said depolymerization is conducted in a fashion and to an extent such that the cold water soluble etherified or esterified starch products hereof have a Brookfield Model RVF viscosity at 20 rpm of less than about 15,000 centipoise when tested in the form of a 10 weight percent starch derivative solids aqueous solution at 25° C. Preferred starch derivatives hereof exhibit a 20 rpm Brookfield Model RVF viscosity of less than 10,000 (more preferably less than 8,000 and most preferably less than 6,000) centipoise when tested in the form of a 10 weight percent aqueous solution thereof at 25° C. Starch derivatives of particular interest herein are those which exhibit a 20 rpm Brookfield viscosity of from about 20 to about 5,000 (preferably from about 50 to about 2,000 and more preferably from about 50 to about 1000) centipoise when tested at 25° C. in the form of a 25 weight percent aqueous solution thereof.

The indicated depolymerization process can be accomplished using generally known acid or enzyme "thinning" techniques. In the event that enzymatic thinning or depolymerization is employed, such operation is suitably conducted with the starch derivative of concern being in the form of an aqueous granular starch slurry or in the form of a gelatinized aqueous starch derivative solution. When acid thinning techniques are employed, the depolymerization step can suitably be conducted in either water or an aqueous lower alkanol solution. In either case, the starch derivative can enter the thinning step in non-gelatinized granular form and can leave the thinning operation (and be recovered) in either non-gelatinized granular form or in gelatinized non-granular form depending upon the conditions (e.g., temperature, water content of the aqueous alkanol solution, etc.) employed within said thinning operation. Alternatively, said starch derivative can enter the thinning process in gelatinized form (i.e., having previously been cooked, pasted or solubilized in or during an upstream step or operation).

In those instances wherein the depolymerization is conducted in an all aqueous reaction medium, the depolymerized product can be recovered by, e.g., spray drying, drum drying, precipitation with a water miscible organic liquid, etc. or can remain in aqueous solution.

As a general rule, the indicated depolymerization or thinning step is conducted upon a starch derivative slurry or solution containing from about 10 to about 100 (preferably from about 30 to about 70) parts by weight of starch derivative solids per 100 in the case of enzymatic thinning or water, lower alkanol, or an aqueous lower alkanol solution containing from about 5 to about 30 weight percent water in the case of acid thinning); at a temperature of from about 50° to about 180 ° C. (preferably from about 100 to about 150° C. in the case of an enzymatic process and from about 50° to about 150° C. in the case of an acid thinning operation); and for a time period of from about 1 minute to about 8 hours (preferably from about 5 minutes to about 2 hours). Acids used in acid thinning operations can be selected from those conventionally employed for acid thinning operations and can be either inorganic or organic in character but are preferably inorganic and are typically employed in an amount ranging from about 0.05 to about 5 (preferably from about 0.1 to about 1) weight percent on a liquid reaction medium weight basis. Conventional types and amounts of the commonly used amylase enzymes can be suitably used in enzymatic thinning operations.

As has been noted above, the etherified or esterified cold water soluble starch derivatives hereof are unique in terms of the clarity possessed by films formed therefrom upon drying aqueous solutions thereof. Typically, such films can be conveniently prepared from about 7 to about 40 weight percent starch derivative solids aqueous solutions and in a dried film thickness of from about 1 to about 3 mils.

For the purposes of the present invention the color of films formed from starch derivatives hereof can be conveniently quantified in terms of Gardner color units as measured in the conventional fashion using a Gardner Colorimeter instrument. Preferred starch derivatives hereof have Gardner colors of about 24 Gardner color units or less.

Film clarity for the purpose of the present invention can be conveniently quantified by determining the amount of insoluble particulate matter contained within the starch derivative of interest. Clarity of the starch derivatives hereof is reflected by such products exhibiting less than 0.25 milliliters of "haze" (i.e., insoluble particulate matter) being separable from 100 milliliters of starch derivative paste (12.5 weight percent starch derivative solids) upon centrifugation at 2000 rpm for 15 minutes. Preferred products hereof exhibit haze levels of less than 0.2 (more preferably less than 0.15 and most preferably 0.1 or less) milliliters of "haze" when tested in the indicated fashion.

The present invention is further understood and illustrated by reference to the following examples thereof in which, unless otherwise indicated, all parts and percentages are on a weight basis and all temperatures are in degrees Celcius.

EXAMPLE 1

In this example, a slurry containing 1200 parts by weight of a hydroxypropylated granular starch material (having a moisture content of about 10 weight percent and an average hydroxypropyl D.S. of about 0.3), 4000 parts by weight of an aqueous 3A ethanol solution (6 weight percent water on a total solution weight basis)

and about 28.4 parts by weight of 5N sulfuric acid is heated in a stirred, sealed reactor, under autogenous pressure, at about 150° C. for 17 minutes, cooled to room temperature (about 25° C.) and centrifuged. The resulting thinned, hydroxypropylated starch product is then washed with 3A ethanol and dried in an oven at 50° C. The product thus prepared has a Brookfield (Model RVF) viscosity at 20 rpm of about 550 cps in a 25% starch solids aqueous solution at 25° C. and dries to form a clear (i.e., substantially haze-free), transparent film when applied as an aqueous solution thereof.

EXAMPLE 2

In this example, a slurry containing 1400 parts by weight of a hydroxypropylated granular starch material (having a moisture content of about 10 weight percent and an average hydroxypropyl D.S. of about 0.3), 4000 parts by weight of an aqueous 3A ethanol solution (6 weight percent water on a total solution weight basis) and about 90.8 parts by weight of 5N sulfuric acid is heated in a stirred, sealed reactor, under autogenous pressure, at about 125° C. for 30 minutes, cooled to room temperature (about 25° C.), neutralized with sodium hydroxide in an aqueous 3A ethanol solution and centrifuged. The resulting thinned, hydroxypropylated starch product is then washed with 3A ethanol and dried in an oven at 50° C. The product thus prepared has a Brookfield (Model RVF) viscosity at 20 rpm of about 2100 cps in a 40% starch solids aqueous solution (which would be approximately 100 cps in a 25% starch solids solution) and dries to form a substantially haze-free, transparent film when dried from an aqueous solution thereof.

While the subject matter hereof has been described and illustrated by reference to particular embodiments and examples thereof, such is not to be interpreted as in any way limiting the scope of the instantly claimed invention.

What is claimed is:

1. A cold water soluble etherified or esterified starch derivative having an average degree of ether or ester substitution of from about 0.05 to about 1 per anhydroglucose unit and which has a Brookfield Model RVF viscosity at 20 rpm of less than 15,000 cps when tested in the form of a 10 weight percent starch derivative solids aqueous solution at 25° and which forms a transparent film when dried from an aqueous solution thereof.

2. The cold water soluble starch derivative of claim 1 wherein said starch derivative is a hydroxyalkylated starch derivative.

3. The cold water soluble starch derivative of claim 2 wherein said starch derivative is a hydroxypropylated starch derivative.

4. The cold water soluble starch derivative of claim 1 wherein said starch derivative has a Brookfield Model RVF viscosity at 20 rpm of less than 10,000 cps when tested in the form of a 10 weight percent starch derivative solids aqueous solution at 25° C.

5. The cold water soluble starch derivative of claim 1 wherein the average degree of ether or ester substitution is from about 0.1 to about 0.5 per anhydroglucose unit within said starch derivative.

6. A process for preparing a cold water soluble etherified or esterified starch derivative which has a Brookfield Model RVF viscosity of less than 15,000 cps when tested in the form of a 10 weight percent starch derivative solids aqueous solution at 25° C. and which forms a transparent film when dried from an aqueous solution thereof, said process comprising the steps of:

(a) etherifying or esterifying a non-derivatized, non-crosslinked granular starch starting material with a monofunctional etherifying or esterifying agent to an average ether or ester degree of substitution in the range of from about 0.05 to about 1 of ether or ester substituents per anhydroglucose unit in said starch material under conditions which result in the etherified or esterified starch derivative remaining in non-crosslinked, non-gelatinized, granular form following the etherification or esterification process;

(b) separating the etherified or esterified granular starch derivative prepared in step (a) from at least a substantial portion of any salt by-products formed during the etherification or esterification reaction;

(c) treating the etherified or esterified starch derivative to render it cold water soluble; and (d) depolymerizing the etherified or esterified starch derivative in a liquid reaction medium to a degree which results in said derivative having a Brookfield Model RVF viscosity at 20 rpm of less than 15,000 cps when tested in the form of a 10 weight percent starch derivative aqueous solution at 25° C.

7. The process of claim 6 wherein the etherification or esterification reaction of step (a) is a substantially dry reaction process wherein the granular starch material has a moisture content of from about 3 to about 15 weight on a moist starch material total weight basis and wherein said starch material is reacted as a mass of solid granules with a liquid or gaseous etherifying or esterifying agent.

8. The process of claim 7 wherein the etherification or esterification reaction is conducted at a temperature of from about 30° to about 100° C. and at a pressure of from about 30 to about 500 psig.

9. The process of claim 6 wherein the etherification or esterification reaction of step (a) is conducted by reacting the monofunctional etherifying or esterifying agent with the granular starch starting material in the form of slurry of said starch starting material in an aqueous lower alkanol solution containing from about 5 to about 25 weight percent water on a total aqueous alkanol solution weight basis.

10. The process of claim 9 wherein the starch starting material/aqueous alkanol slurry contains from about 10 to about 100 parts by weight of said starch starting material per 100 parts by weight of said aqueous alkanol solution.

11. The process of claim 10 wherein the etherification or esterification reaction is conducted at a temperature of from about 100° to about 180° C.

12. The process of claim 11 wherein the etherification or esterification reaction is conducted at a pressure of from about 0 to about 400 psig.

13. The process of claim 6 wherein the etherification or esterification reaction of step (a) is conducted by reacting the monofunctional etherifying or esterifying agent with the starch starting material in the form of a water slurry thereof containing from about 10 to about 70 parts by weight of said starch starting material per 100 parts by weight of water and wherein the resulting etherified or esterified granular starch product contains an average of from about 0.05 to about 0.15 ether or ester substituents per anhydroglucose unit within said starch product.

14. The process of claim 6 wherein salt by-products are separated from the etherified or esterified starch derivative by washing said starch derivative with an aqueous lower alkanol solution containing from about 5 to about 50 weight percent water on a total solution weight basis.

15. The process of claim 6 wherein the etherified or esterified starch derivative is rendered cold water soluble by heating a slurry of said starch derivative in an aqueous lower alkanol solution containing from about 10 to about 30 weight percent water on a total solution weight basis to a temperature of from about 100° to about 180° C. for a time period of from about 5 seconds to about 15 minutes.

16. The process of claim 6 wherein the liquid medium in which the etherified or esterified starch derivative is depolymerized is water, a lower alkanol or an aqueous lower alkanol solution.

17. The process of claim 6 wherein the etherified or esterified starch derivative is depolymerized by dispersing from about 10 to about 100 parts by weight of said starch derivative in 100 parts by weight of an aqueous lower alkanol solution containing, on a total solution weight basis, from about 5 to about 30 weight percent water and from about 0.05 to about 5 weight percent of an organic or inorganic acid and maintaining the resulting dispersion at a temperature of from about 20° to about 180° C. for a time period of from about 1 minute to about 8 hours.

18. A process for preparing a cold water soluble etherified or esterified starch derivative which has a Brookfield Model RVF viscosity at 20 rpm of less than 15,000 cps when tested in the form of a 10 weight percent starch derivative solids aqueous solution at 25° C. and which forms a transparent film when dried from an aqueous solution thereof, said process comprising the steps of:
 a. obtaining or preparing a non-crosslinked granular etherified or esterified starch derivative having an average ether or ester degree of substitution ranging from about 0.15 to about 1 ether or ester substituents per anhydroglucose unit in said starch derivative; and
 b. contacting said starch derivative with an aqueous lower alkanol solution containing, on a total solution weight basis, from about 5 to about 30 weight percent water and from about 0.1 to about 5 weight percent of an organic or inorganic acid at a temperature of from about 20° to about 180° C. for a time period of from about 1 minute to about 8 hours.

19. The cold water soluble starch derivative of claim 1 wherein said starch derivative has a Brookfield Model RVF viscosity at 20 rpm of less than 6,000 cps when tested in the form of a 10 weight percent starch derivative solids aqueous solution at 25° C.

20. The cold water soluble starch derivative of claim 19 wherein said starch derivative exhibits less than 0.2 milliliters of insoluble particulate matter being separable from 100 milliliters of a starch derivative paste containing 12.5 weight percent starch derivative solids upon centrifugation at 2000 rpm for 15 minutes.

* * * * *